US009824331B2

(12) United States Patent
Nagasubramaniam et al.

(10) Patent No.: US 9,824,331 B2
(45) Date of Patent: Nov. 21, 2017

(54) SYSTEM AND METHOD FOR HANDLING SOCIAL MEDIA INPUTS IN AN EXISTING MULTI CHANNEL CONVERGED CSTA BASED INFRASTRUCTURE

(71) Applicant: TECH MAHINDRA LIMITED, Pune (IN)

(72) Inventors: Sankarnarayanan Nagasubramaniam, Pune (IN); Milind Shridhar Jalwadi, Pune (IN)

(73) Assignee: Tech Mahindra Limited, Pune (IN)

( * ) Notice: Subject to any disclaimer, the term of this patent is extended or adjusted under 35 U.S.C. 154(b) by 337 days.

(21) Appl. No.: 14/566,594

(22) Filed: Dec. 10, 2014

(65) Prior Publication Data

US 2015/0169775 A1   Jun. 18, 2015

(30) Foreign Application Priority Data

Dec. 12, 2013   (IN) .......................... 3873/MUM/2013

(51) Int. Cl.
| | | |
|---|---|---|
| G06F 17/30 | (2006.01) | |
| G06Q 10/10 | (2012.01) | |
| G06Q 30/00 | (2012.01) | |
| G06Q 50/00 | (2012.01) | |

(52) U.S. Cl.
CPC .......... G06Q 10/107 (2013.01); G06Q 30/01 (2013.01); G06Q 50/01 (2013.01)

(58) Field of Classification Search
None
See application file for complete search history.

(56) References Cited

U.S. PATENT DOCUMENTS

| | | | | |
|---|---|---|---|---|
| 6,064,731 | A * | 5/2000 | Flockhart ................ | H04M 3/51 379/265.06 |
| 7,747,705 | B1 * | 6/2010 | Raja ...................... | G06Q 10/107 709/201 |
| 2009/0292583 | A1 * | 11/2009 | Eilam .................... | G06Q 10/06 705/7.31 |
| 2011/0106721 | A1 * | 5/2011 | Nickerson .............. | G06Q 30/02 705/347 |
| 2011/0302316 | A1 * | 12/2011 | Chou ...................... | H04L 67/02 709/228 |
| 2012/0101808 | A1 * | 4/2012 | Duong-Van ......... | G06F 17/2785 704/9 |
| 2016/0127560 | A1 * | 5/2016 | Rist ................... | H04M 3/42263 709/228 |

* cited by examiner

*Primary Examiner* — Etienne Leroux
*Assistant Examiner* — Farhad Agharahimi
(74) *Attorney, Agent, or Firm* — Wiley Rein LLP

(57) ABSTRACT

Disclosed are methods and systems for handling social media inputs in an existing multi-channel converged CSTA based infrastructure. The methods and systems may be characterized by determination of priority and potential churn index of the inputs received from sentiment analysis module based on predetermined parameters. The inputs are translated into qualifier by using predetermined combinations of severity index and anticipated churn index, which are then adapted into the CSTA specifications. Thereafter, the method and system includes determination of routing of the adapted posts for further treatment using inbound mechanism or outbound mechanism. Specifically, the routing of the inbound post is carried out leveraging the "one number service" of the CSTA based infrastructure.

8 Claims, 5 Drawing Sheets

|                | Anticipated Churn Index |        |      |
| -------------- | ----------------------- | ------ | ---- |
| Priority Index | Low                     | Medium | High |
| Low            | O                       | O      | I    |
| Medium         | O                       | O      | I    |
| High           | I                       | I      | I    |
| **Prefered Routing Treatment is Indicated as "I" for Inbound OR "O" for Outbound ||||

FIG. 3a

SYSTEM AND METHOD FOR HANDLING SOCIAL MEDIA INPUTS IN AN EXISTING MULTI CHANNEL CONVERGED CSTA BASED INFRASTRUCTURE

RELATED APPLICATIONS

This application claims priority benefit of Indian Patent Application No. 3873/MUM/2013, filed 12 Dec. 2013 and incorporated fully herein for all purposes.

FIELD OF THE INVENTION

The present embodiments relate to the treatment of social media inputs in a multi-channel converged CSTA-based fixed mobile converged infrastructure, and more specifically, to improving existing techniques and adding new functionalities to the realm of customer relationship management systems and protocols and interfaces defined by CSTA which are used by the ACD/CRM systems for treating the interaction channels such as voice, email, chat and the like.

BACKGROUND

Traditionally, customer relationship management systems have leveraged vendor specific Automatic Call Distributor (ACD) methods for routing of traditional channels such as voice. These methods are more appropriate for voice channels, however, and typically use parameters such as Automatic Number Identification/Dialed Number Identification Service (ANI/DNIS) and Customer Relationship Management (CRM) data related to the subscriber/caller for routing the voice calls to the appropriate agent. The agent has a front end which is typically integrated with back end systems for providing details about the caller to enable the agent to appropriately understand the call-related interaction. Additionally, in an event of multi-channel handling such as email and Short Message Services (SMS), these are typically treated as non-interactive channels, and are routed to agents leveraging various algorithms including a blended way to handle incoming/outgoing traffic across the channels thereby optimizing agent time.

With the emergence of social media channels and the dynamic nature of online feedback through blogs, wikis, Tweets and other internet-based communities, customers are able to reach out widely to share feedback regarding products and service experiences. Unlike traditional channels, such as voice/video calls, feedback from social media channels is instantaneous, and hence the ability of the agent to respond quickly to such feedback for the enterprises is crucial.

Hence, it is important to effectively and quickly treating inputs from social media channels in the context of a "Multi-Channel Interaction" center. This implies that the treatment of inputs from social media channels has to be different from conventional methods that have been adopted for non-interactive channels, such as SMS and email, and traditional channels, such as voice, chat and the like. Typically, the feedbacks/comments from the social media channels are obtained through crawlers. The posts/feedback/comments obtained through crawlers are used as input to perform the sentiment analysis. Based on the sentiment analysis, the posts/feedback/comments are handled by social media relationship platforms which are an extension of the traditional customer relationship management systems.

The currently available method employed in Services for Computer Supported Telecommunications Applications (CSTA)-supported Fixed Mobile Convergent infrastructure does not facilitate a mechanism to treat relevant additional routing/key parameters applicable for social media within the CSTA specification. This limitation can be overcome through a separate non-CSTA-based mechanism for such treatments. This results, however, in additional costs/infrastructure to the existing CSTA-supported infrastructure. Additionally, this limitation on CSTA-supported infrastructure restricts the balanced treatment of Social Media Interactions vis-à-vis other interactions by having common priorities across the different channels.

Accordingly, there exists a need to provide methods and systems that address these challenges effectively in a Multi-Channel Fixed Mobile Convergent infrastructure, leveraging CSTA through suitable enhancements.

SUMMARY

Aspects of the present embodiments ameliorate, or to at least provide a useful alternative to, current approaches in a Multi-Channel Fixed Mobile Convergent infrastructure.

More specifically, an aspect of the present embodiments provides the ability for the Service Provider to integrate and treat the Social Media at par with other channels for effective treatment of Social Media Posts in a CSTA-supported Fixed Mobile Converged Infrastructure. Another aspect enhances a CSTA protocol to enable the handling of routing for Social media inputs in a balanced manner taking into consideration of the traffic across other channels. Another aspect provides for a flexible routing service for Social media Inputs. The routing logic may use a varied set of Parameters to efficiently route the posts/feedback/comments (Social Media Inputs) which as can be interpreted is evidently different for traditional channels such as Voice, SMS.

Still another aspect provides a way to prioritize the Social media posts across with additional qualifiers for Incoming/Outbound treatment. Another aspect of the present embodiments extends the use of the "One Number Service" to Route feedbacks received on Social Media Channels. Yet another aspect determines the best possible option for routing to the participant by using a sliding window mechanism. Still another aspect determines the potential churn index and schedules an Outgoing campaign through CRM. Yet another aspect of the present embodiments adds suitable extensions to the CSTA Specifications for qualifying the routing logic. An additional aspect of the present embodiments eliminates any inconsistency in the routing logic by building an ability to change the configuration of the sliding window dynamically. Yet another aspect of the present embodiments provides a user interface for configuring the parameters applicable for routing to the enterprise. A further aspect of the present embodiments facilitates authorized users to configure the parameters applicable for the disclosed system/method.

Accordingly, in one aspect, the present invention provides a method for handling social media inputs in an existing multi-channel converged CSTA based infrastructure. The method may include receiving social media posts as an input, and performing sentiment analysis by using inputs received from the social media. Further, the method may include determining of priority and potential churn index of the inputs received after sentiment analysis based on pre-determined parameters. Specifically, each predetermined parameter has predefined weightage and scale.

Further, the method may include translating the weighted indices into qualifier by using predetermined combinations of severity index and anticipated churn index, adapting the translated and computed indices with the selected posts into the CSTA specifications and determining routing of the adapted posts for further treatment using inbound mechanism or outbound mechanism. More specifically, the routing of the inbound post can be carried out leveraging the "one number service" of the CSTA based infrastructure.

In another aspect, the present embodiments provide a system for handling social media inputs an existing multichannel converged CSTA based infrastructure. The system may include a crawling module for providing social media post as inputs, and a sentiment analytics module for performing sentiment analysis by using inputs received from the crawling module. The system can be characterized by comprising a prioritization and churn module for determining of priority and potential churn index of the posts/inputs received from the sentiment analytics module based on predetermined parameters and translating the priority and potential churn index to predetermined combinations of severity index and anticipated churn index. The system may further include a routing module for dynamically computing predetermined parameters and routing the post received from the prioritization and churn module. Specifically, the routing module routes the posts by leveraging "one number service" of the CSTA based infrastructure.

Furthermore, the system may include a social media interworking gateway module for adapting the routed post to the CSTA specification, CSTA adaptation stack to be used by the social media interworking gateway module to construct the enhanced payload, a CSTA protocol stack capable of receiving service execution instructions from the CSTA adaptation stack through established Session Initiation Protocol (SIP)-CSTA sessions, and an outbound campaign module for specifically identifying specific churn treatment, based on the enhanced payload, by instructing the social interworking gateway through a REST based mechanism. Additionally, the system may include a graphical interface to configure to prioritization related fields, weightage and various thresholds for the churn index.

Other advantages of the present embodiments will be more apparent from the following description when read in conjunction with the accompanying figures, which are not intended to limit the scope of the present invention.

BRIEF DESCRIPTION OF THE DRAWINGS

FIG. 3a and FIG. 3b illustrate routing treatment based on the prioritization logic, in accordance with an embodiment. FIG. 3a shows an embodiment of Step 1 of FIG. 2, Prioritization and Potential Churn Index Determination. FIG. 3b shows an embodiment of Step 2 of FIG. 2 for Determination of Routing Logic.

DETAILED DESCRIPTION

Figure 1:
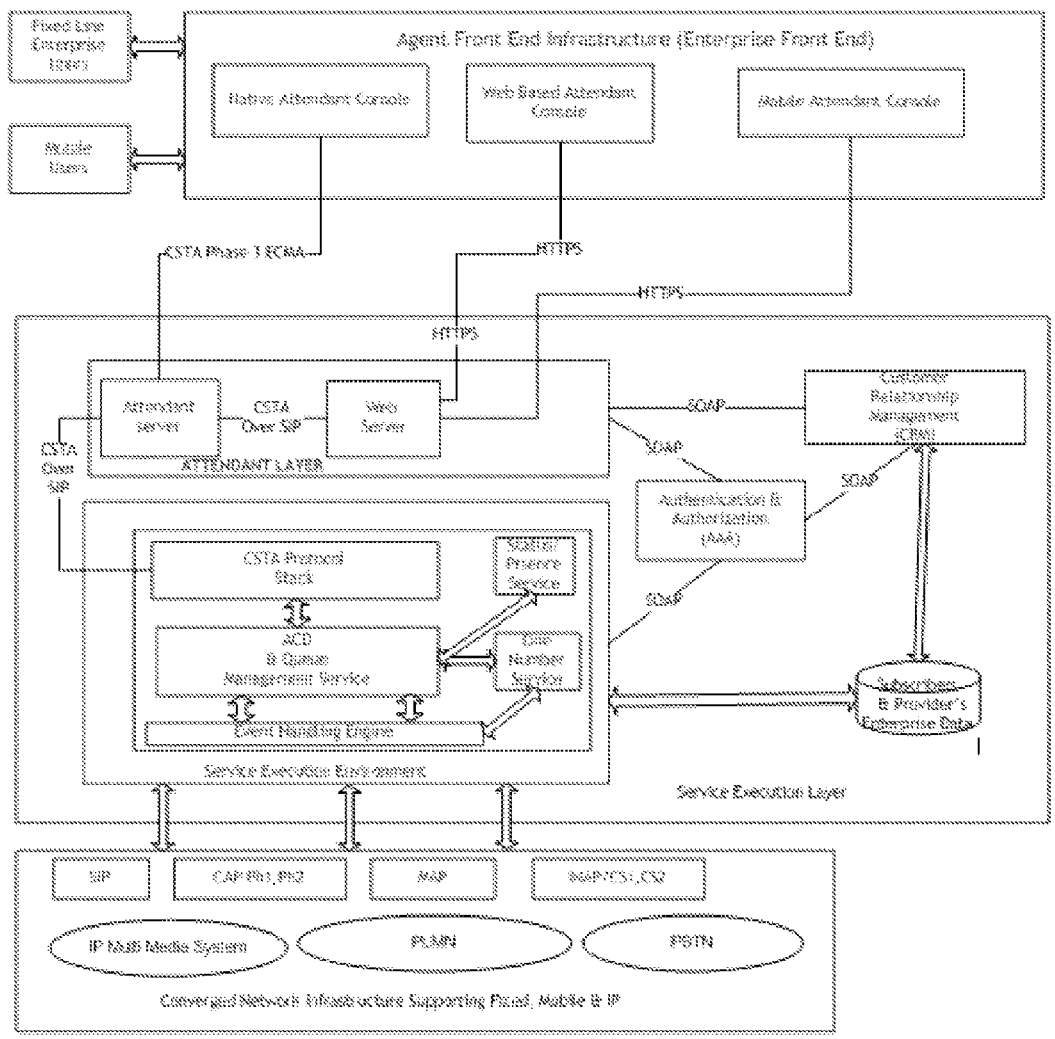
FIG. 1 illustrates a typical existing realization view of the service provider for supporting enterprise agents, fixed and mobile users leveraging CSTA, of the prior art.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

As used herein and in the claims, the singular forms include the plural reference and vice versa unless the context clearly indicates otherwise. The term "or" is inclusive unless modified, for example, by "either." Other than in the operating examples, or where otherwise indicated, all numbers expressing quantities or conditions used herein should be understood as modified in all instances by the term "about."

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

Definition of Terms:

The term "systems" as used herein refers to the systems/ platforms.

The expression "CSTA" refers to Computer Supported Telecommunications Applications.

The expression "ECMA" refers to European Computer Manufacturer Association.

The expression "IMS" refers to the IP Multi Media System.

The expression "PSTN" refers to the Public Switching Telephony Network.

The expression "ECMA-269" refers to ECMA-269 Services for Computer Supported Telecommunications Applications (CSTA) Phase III.

The expression "ECMA-285" used hereinafter in the specification is ECMA-285 Services for Computer Supported Telecommunications Applications (CSTA) Phase III.

The expression "ECMA-323" refers to ECMA-323 Services for Computer Supported Telecommunications Applications (CSTA) Phase III.

The expression "ASN.1" stands for Abstract Syntax Notation One (ASN.1), and is a standard and formal notation for describing the data, encoding the data, transmitting the data, and decoding the data in telecommunications and computer networking.

The term "Provider" refers to a Telecom/Internet Service Provider.

The expression "SIP" refers to the Session Initiation Protocol.

The expression "FMC" refers to Fixed Mobile Convergence.

The terms "Participant," "Agent," or "Attendant" are referred to interchangeably and describe an attendant or a hunting group agent.

The phrase "Hunting Group" refers to a group of participants.

The term "Supervisor" refers to a specialized role of monitoring the Agents/Participants productivity and providing an active feedback on the transactions for the assigned and emergency tasks that are routed for immediate attention.

The phrase "One Number Service" refers to the One Number Service offered by any provider. The "One Number Service" facilitates routing of calls to the public entry point of the enterprise. This number is also referred to as the company number to which a hunting group is able to answer a specific set of questions related to the business of the enterprise.

The expression "ACD" refers to Automatic Call Distributor.

The expression Multi-Channel used hereinafter in the specifications refers to support of multiple channels such as voice, SMS, chat, and email.

The term "Inbound" refers to an incoming request on a channel that is presented to the Multi-channel infrastructure (i.e to a CSTA infrastructure in this case).

The term "Outbound" refers to an Outgoing request on a channel from the multi-channel infrastructure (CSTA infrastructure in this case).

The expression "SAC" refers to Service Access Client.

The expression "SAE" refers to Service Access endpoint.

The term "Crawler" refers to a software program performing the function of systematically browsing the World Wide Web for the purpose of Web indexing.

The expression "ANI/DNIS" refers to Automatic Number Identification/Dialed Number Identification Service.

The expression "CRM" refers to Customer Relationship Management.

The above definitions are in addition to those expressed in the art.

The present embodiments provide a system for handling social media inputs an existing multi-channel converged CSTA based infrastructure. For example, the system and method of the present invention assists the service providers in effectively treating the social media inputs for the enterprise customers.

Current methods employed in Services for CSTA-supported Fixed Mobile Convergent infrastructure do not facilitate a mechanism to treat relevant additional routing/key parameters applicable for social media within the CSTA specification. This limitation can be overcome through a separate non-CSTA-based mechanism for such treatments. This results, however, in additional costs/infrastructure to the existing CSTA-supported infrastructure. Additionally, this limitation on CSTA-supported infrastructure restricts the balanced treatment of Social Media Interactions vis-à-vis other interactions by having common priorities across the different channels.

More specifically, U.S. Pat. No. 8,634,540 refers to activities performed by a client at a site of an organization which are monitored and stored in an activity database. A call is thereafter received from the client at a telephone system of the organization, which performs an identification of the client. The identification is provided to a cross-channel router as a request for a prediction on where the call from the client should be routed, and the router indexes into the activity database based on the identification of the client to obtain the monitored activity of the client. The router employs predicting rules and the obtained activity to generate a prediction of client needs, and returns the generated prediction to the telephone-based system, which presents prioritized telephone prompts to the client according to the returned prediction to help in routing the call.

Additionally, U.S. Patent Application Publication No. 2005/0144621 refers to a method for receiving one or more CSTA3 (Computer Supported Telecommunications Applications Phase III) service requests from a control application; decoding the one or more CSTA3 service requests; generating one or more switch service requests corresponding to the one or more CSTA3 service requests; and reporting the one or more switch service requests to a switch application.

Also, PCT Application WO 2010/069228 refers to an interactive voice response (IVR) service processing method based on computer supported telecommunications application CSTA protocols in the communications technology field, which includes the following steps: a CSTA message is constructed, containing integrated special resource operating characteristics; the CSTA message with said special resource operating characteristics is transmitted to process an IVR service. The publication also refers to a CSTA-based IVR service processing apparatus and system. Embodiments of the invention reduce message interaction between the computer-side and the switch-side, and improve the performance at both these sides; at the same time they satisfy customer play-and-collect requirements, and overcome the disadvantages of current CSTA protocols. They also enrich the requirements of IVR service, broaden the application field of CSTA protocols, and increase the market competitiveness of the SOFT Automatic Call Distribution (SOFT-ACD).

Further, U.S. Pat. No. 6,985,575 refers to a control interface for CSTA protocols that utilizes ActiveX properties, methods, events, and pages to access all of the events and services provided by the CSTA protocols. Common paradigms such as Invoke-ID and timers are built in to the interface. The interface further provides statistics and diagnostics via property pages.

Additionally, U.S. Patent Application Publication No. 2011/0299523 refers to a method for coordination of information at the network-based level between call centers connectable over a telecommunications network, such as a telephone network, and a packet network, creates improved integration of and bonding between a customer's interaction with a Web site and with a call center. Information about the customer and the customer's Web interaction are delivered to the call center agent along with the call, leading to increased productivity and efficiency in call handling and improved call routing. Calls may be routed to existing call centers based upon information from the Web experience, and information from the user's Web interaction is shared with the call center. Web interaction information is passed to existing call centers using known call center external control methods, such as DNIS signaling. Information about the Web experience may also be "whispered" to the call center agent, and an agent may "push" Web pages for review by the customer.

Another patent, U.S. Pat. No. 7,953,859, refers to a contact center that includes a switching fabric operable to configure a communication session between a first customer and a first resource for servicing of a first contact by the first resource and a contact tracking agent operable, during the servicing of the first contact by the first resource, to (a) monitor the first contact center endpoint for at least one of (i) a change in contact state, (ii) the connection of the first resource and the first customer through a second (new) communication channel, and (iii) the addition of a party to and/or removal of a party from the communication session and (b), when the at least one of (i)-(iii) occurs, terminate a first contact part and create a second contact part. The first and second contact parts are associated with the communication session.

U.S. Patent Application Publication No. 2006/0203993 refers to multiple communication types integrated into a call center. The communication types can be chat, email, Internet Protocol (IP) voice, traditional telephone, web page, digital image, digital video and other types. Features of the invention include allowing a single agent to handle multiple customers on multiple channels, or "endpoints." Prioritizing and assigning calls to agents based on a specific criteria such as the number of endpoints assigned to an agent, the agents availability, the priority of a customer call, the efficiency of a given agent and the agent's efficiency at handling a particular communication type call. An agent user interface is described that allows the agent to have control over accepting multiple calls. The agent can drag and drop canned responses, images, URLs, or other information into a window for immediate display on a customer's computer. The system provides for detailed agent performance tracking. The system provides failure recovery by using a backup system. If the network server fails, then the customer is connected directly to an agent. When a failed computer comes back on line, the statistics gathered are then used to synchronize the returned computer. The system provides extensive call recording or "data wake" information gathering. The system provides flexibility in transferring large amounts of historic and current data from one agent to another, and from storage to an active agent. The system integrates human agents' knowledge with an automated knowledge base. The system provides for an agent updating, or adding, to the knowledge base in real time. The system also provides for "blending" of different communication types.

Finally, PCT Application No. WO 1999/012100 refers to an interactive data communication in which a user is connected through a network to a multimedia response server. The user presses an appropriate keyboard or mouse clicks on an appropriately labeled button on a data page. An automatic call distribution device switches the session to a customer service queue for routing to the next available customer service representative. When the interactive session between the user and the customer device representative is completed, session control passes back to the data page server and a normal interactive session is resumed.

None of these references, however, facilitates a mechanism to treat relevant additional routing/key parameters, applicable for social media, within the CSTA specification.

The embodiments herein and the various features and advantageous details thereof are explained with reference to the non-limiting embodiments in the following description and references to the accompanying drawings. The description provided is purely by way of example and illustration. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present embodiments provide for an ability to leverage existing CSTA-based infrastructure investments for social media inputs, and are advantageous in treating the social media posts in an existing "One Number service" offered by the service provider to various enterprises. The embodiments also facilitate deferred treatment for low priority social media input, and provides an active feedback mechanism on the anticipated churn to the CRM systems.

In order to address the limitations of the prior art, the current embodiments aim to bring in an optimized mechanism for the following: (a) A mechanism to treat social media inputs in a seamless and consistent manner across all channels with minimum additions to traditional multi-channel converged CSTA based infrastructure of a service provider network supporting the "One number service" as a part of fixed mobile convergence; (b) An efficient method of dynamically routing the social media posts to the agents; (c) An active feedback mechanism to the CRM system on the potential churn which could be leveraged by the CRM system for taking/suggesting further actions; and (d) A mechanism to route the "Post" to a carrier/service provider infrastructure to leverage the existing converged (fixed/mobile convergence) infrastructure for the delivery of the social media posts to the enterprises availing "One Number Service" to reach the Fixed/Mobile terminals through the Service Provider's network.

Referring to FIG. 1, this illustrates a typical existing realization view of the service provider for supporting enterprise agents, fixed and mobile users, leveraging CSTA specifications in a typical CSTA-based fixed mobile convergent infrastructure. It is important to note that many service providers have a "Traditional One Number Attendant Service" hosted for the enterprises. This infrastructure typically facilitates an enterprise agent/attendant console to handle the incoming voice calls, and also enables transferring of the One number calls to the enterprise users irrespective of the user terminal (which can be fixed, mobile or Internet Protocol (IP) terminals).

In order to give a converged experience, with the advent of social media channels, it would be a vital need to integrate the Social Media Feedback into this existing CSTA-based Fixed Mobile Converged infrastructure in a seamless manner. A typical such infrastructure which hosts the "One Number/Attendant Service" for the enterprises is detailed in FIG. 1. As can be interpreted from the figure, infrastructure enables a variety of user terminals to be used, and as a part network convergence (PSTN, PLMN and IMS).

The service provider typically configures/predefines a particular phone number to belong to a virtual number for a particular enterprise. This virtual number is configured in the network and all voice calls towards this virtual number are routed to the One Number Service. Typically, the attendant does not handle more than one incoming call or interaction; the only exception to this being when two calls are handled as a part of consultation call, when required.

The agent front end (also referred to as the CRM front end) enables treatment for the incoming interactions through various channels. The services and events are received through CSTA Specifications (ECMA 269/ECMA 323). The agent layer acts a CSTA client, and the service provider infrastructure provides a mechanism to establish SIP/CSTA sessions. The sessions carry the services and events as defined in the CSTA Specifications. Typically, that agent can have console that is mobile-based as well as traditional desktop/PC. Upon receipt of calls coming through the One Number Service, the ACD algorithm applies the defined routing rules for the various queues which are created for the enterprise. In the event that all participants/agents are busy, the CSTA mechanism enables invocation of various services, and the calls are typically queued through a queue management mechanism.

Typically, the agent front-end is integrated with the back-end system CRM for providing details of the caller to enable the agent to appropriately understand the call related interaction. It may also be noted that in the event of multi-channel handling such as email and SMS, these are treated as non-interactive channels and are routed to agents leveraging various algorithms including a blended way to handle incoming/outgoing traffic across the channels thereby optimizing agent time.

Importantly, businesses should realize that with the emergence of social media channels and the dynamic nature of online feedback through blogs, wikis, tweets, internet-based communities and the like, customers are able to reach out widely to share their feedback about products and service experiences. Also importantly, businesses should realize that unlike traditional channels, such as voice/video calls, feedback from social media channels is instantaneous; and hence the ability of an agent to respond quickly to such feedback is important to the enterprise.

Hence, effectively and quickly treating the inputs from Social Media Channels in the context of a "Multi-Channel Interaction" Centre is important. This implies that the treatment of inputs from social media channels have to be different than the conventional methods that are currently adopted for non-interactive channels. An example of novel treatments for such channels and steps involved in terms of Prioritization and Routing are detailed in FIG. 2.

Figure 2:
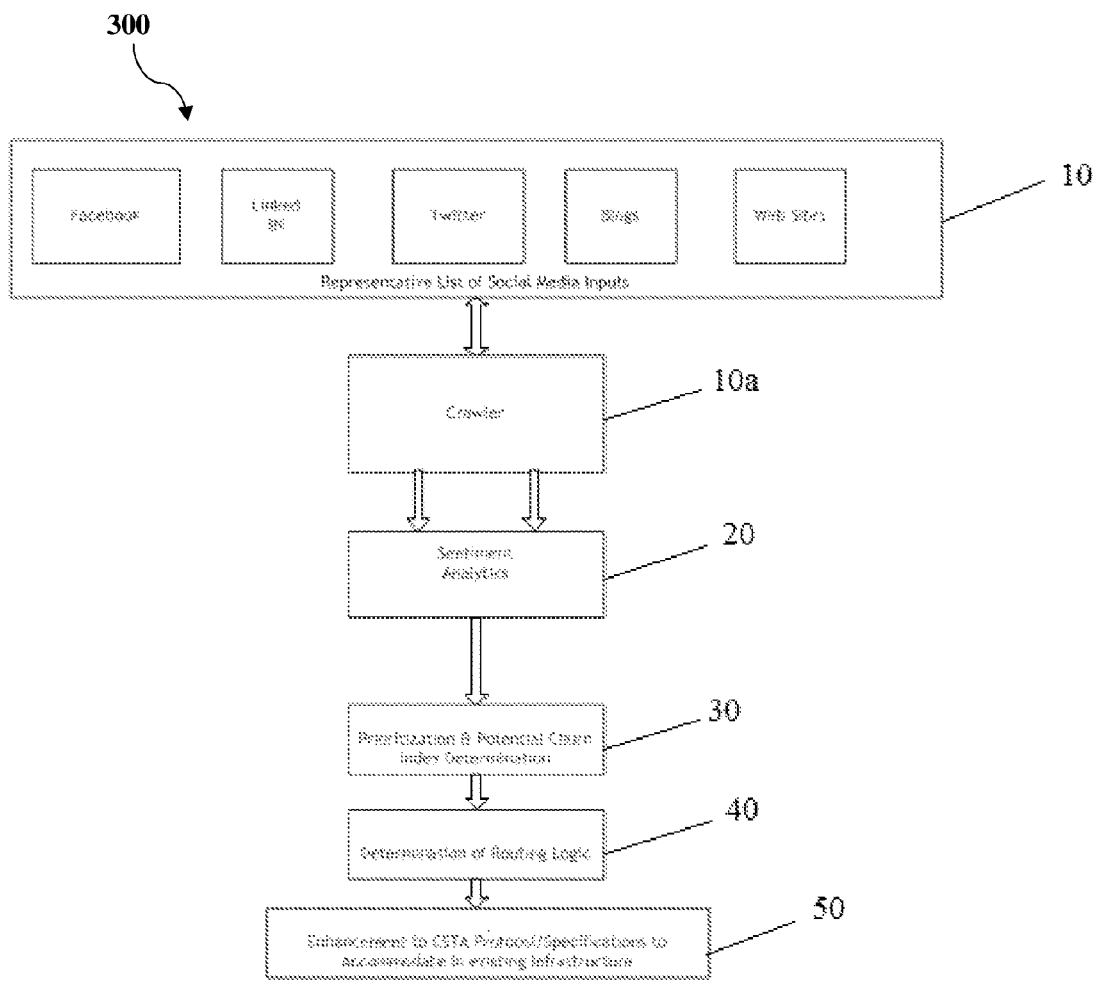
FIG. 2 illustrates a method for handling social media inputs in an existing multichannel converged CSTA based infrastructure, in accordance with an embodiment.

Some example systems and methods of the present embodiments are described with reference to FIG. 2 to FIG. 4. Referring to FIG. 2, there is shown an example method 300 for handling social media inputs in an existing multi-channel converged CSTA-based infrastructure, in accordance with the present embodiments. The steps are detailed as a simple flow chart to explain the treatment applicable for social media channels. The set of steps are detailed below as follows: At step 10, method 300 includes receiving social media posts as an input. In an embodiment, the social media posts/feedbacks/comments received from blogs, web sites and the like are obtained through crawlers as depicted in step 10a. It may evident to those skilled in the art, however, that other ways of receiving a social media post may be used.

At step 20, method 300 includes performing sentiment analysis by using inputs received from the social media. Specifically, the comments obtained through crawlers are used as input to perform the sentiment analysis. It may be evident to those skilled in the art, however, that the comments/posts can be received through other social media channels such as Facebook®, LinkedIn®, Twitter® computer services, and the like. Such comments/posts are also used as inputs to perform the sentiment analysis The present invention is characterized by following steps in method 300. At step 30, method 300 includes determination of priority and potential churn index based on predetermined parameters. Specifically, each predetermined parameter has predefined weightage and scale, details elaborated below. The logic for prioritization of the posts is described below. The following parameters are used for the prioritization of the posts: (a) Sentiment analysis feedback (negative, neutral & positive feedback); (b) Influencer Index (e.g., KloutScore, KredScore or any Similar index); (c) Categorization values based on the importance for "Various Keywords" (Example: Products such as Broadband, Billing, etc., and Services associated with the Product); (d) Alexa® rank of the Source; (e) Google® rank of the Source; (f) Number of likes for posts determined as negative through sentiment analysis; (g) Number of Shares for posts determined as negative through sentiment analysis. Each of these parameters is given a weightage and scale. For each of the received post from the crawlers, the weighted index is calculated. In addition, a potential churn index is calculated based on a subset of the parameters listed above. The calculation of anticipated churn index also takes into account whether the feedbacks/posts are for existing/new services.

The weighted indices obtained through the above mechanism are translated into the following qualifiers: High Severity Index (indicating/translating into a high priority) and High Anticipated Churn Index (essentially impact is high & risk on churn is high-expected to be treated in inbound mechanism with highest priority); High Severity Index (indicating/translating into a high priority) and Medium Anticipated Churn Index (essentially impact is high and risk on churn is medium-expected to be treated in inbound mechanism with highest priority); and High Severity Index (indicating/translating into a high priority) and Low Anticipated Churn Index (essentially impact is high and risk on churn is low-expected to be treated in inbound mechanism with highest priority).

At step 40, method 300 includes determination of routing treatment for further treatment using inbound mechanism or outbound mechanism. Specifically, the routing of the inbound post is carried out leveraging the "one number service" of the CSTA based infrastructure supporting fixed, mobile, and IP terminals. Specifically, and example the routing treatment is described in conjunction with FIG. 3a and FIG. 3b.

Further, it may be inferred from the above explanation on prioritization that nine combinations for the routing treatment are possible as represented in FIG. 3a, with an option to decide whether to treat it in inbound mechanism or in outbound mechanism. Note also that the weighted indices qualifying the "Anticipated Churn" and other relevant parameters are passed on to the CRM system in real time for further actions, such as using the inputs for creating a specific campaign or making a note of the social media inputs that could be handled through a deferred treatment as appropriate.

As can be observed, the qualifiers on the priority are also used to determine if the post is to be handled in inbound or outbound mechanism. This also means that the following three objectives are met: (1) Any blending algorithm across inbound & outbound is now balanced as the prioritization mechanism qualifies the same along with the fact that the "High Severity ones" are marked for an immediate treatment across channels & the low priority ones can be marked for outbound/deferred treatment; (2) An active real-time feedback mechanism on the anticipated churn to the CRM system which can aid in taking further course of actions including an ability to schedule an outbound campaign; (3) Participant/Agent Time is utilized effectively.

It may be evident to those skilled in the art that the parameters given above are a representative list, and more such parameters could be added. Based on the prioritization, the post/comments are distributed to the various queues of the agents by adopting the following routing algorithm. As a pre-requisite the following system wide parameters are configured/defined: (a) Each participant is assigned a proficiency level based on the ability to handle negative, neutral and positive feedback. The participants having the same proficiency levels for particular category are represented in a group. (b) Posts are categorized under various "Key Words" which are mapped to the queues and essentially form the work list for the agents/participants. (c) Each agent's "waiting time for the post" is measured when an agent previously busy in any social media interaction/post is no longer engaged in the interaction or any related work related to the previous transaction. (d) Maximum allowed threshold, which essentially is the "waiting_time_for_the_post" for a particular category.

Figure 3B:
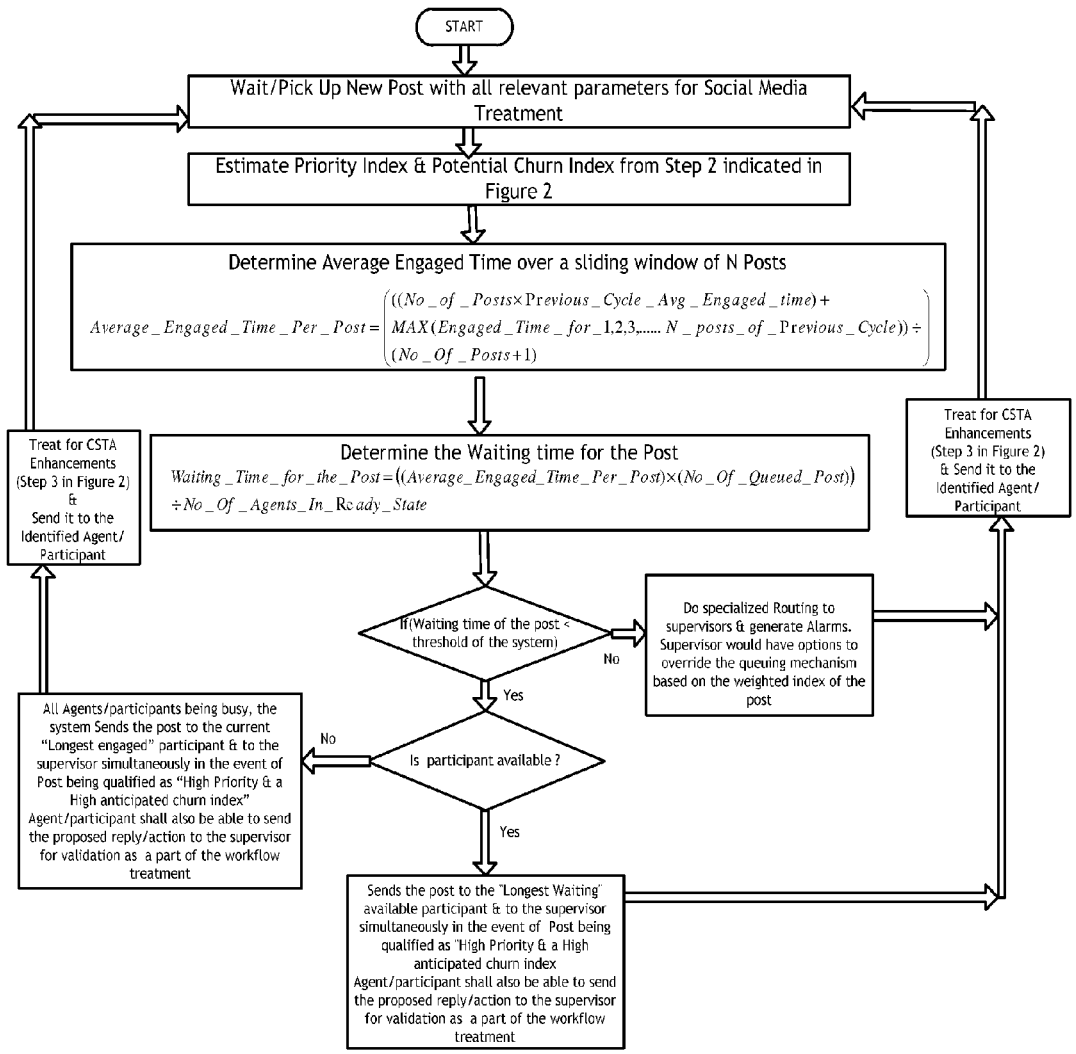

The detailed steps for routing are shown in FIG. 3b. The details of the algorithm are explained in the following text. As a first step after the prioritization, the post/comments are distributed to the various incoming queues of the agents by adopting the following algorithm. For every new post, the "waiting time" for a newly received post is calculated as per flowchart of FIG. 3b. An "average expected engaged time" for responding to post received in social media channel is estimated based in a dynamic manner by actually averaging the time taken for handling post over a "sliding window of say last attended fifty (50) posts (configurable in the system as a parameter). The average handling time for the post is calculated as per the flowchart of FIG. 3b.

The formula is calculated by adopting a sliding window of say "N" Posts on a reoccurring basis to arrive at the average expected engaged time.

If the "waiting time for the post" is less than the threshold defined in the system, the algorithm proceeds by finding the list of participants with same skillsets available. Upon determining the list of the available participant in the group, the algorithm does the following based on the encountered scenario.

Some of the sample scenarios are detailed below:

Scenario 1: Sends the post to the "longest waiting" available participant and to the supervisor simultaneously in the event of post being qualified as "high priority and a high anticipated churn index" (impact is high and risk is high—to be treated in inbound mechanism with highest priority). As a part of the severity treatment, the agent/participant shall be able to send the proposed reply/action to the supervisor for validation as a part of the workflow treatment. Further to the above the Supervisor will be able to confirm the response/modify and resend to Agent/Participant for sending the response.

Scenario 2: In the event that all agents/participants are busy, the system sends the post to the current "longest engaged" participant and to the supervisor simultaneously in the event of post being qualified as "high priority & a high anticipated churn index" (impact is high & risk is high—to be treated in inbound mechanism with highest priority). As a part of the severity treatment, the agent/participant shall be able to send the proposed reply/action to the supervisor for validation as a part of the workflow treatment. Further to the above the supervisor will be able to confirm the response/modify and resend to agent/participant for sending the response.

If the waiting time for the post exceeds the threshold during the polling exercise of finding a free agent, then the system would do specialized routing to the supervisor & generate alarms. The supervisor would have options to override the queuing mechanism based on the weighted index of the post.

The routing scenarios for all other combinations can be inferred from FIG. 2. It may be noted that for outbound routing, the blended rate of inbound and outbound traffic configured in the existing network could be leveraged so that the agent shall get a notification to act on the post.

At step 50, method 300 includes enhancement to CSTA protocol/specifications accommodate in existing infrastructure.

Figure 4:
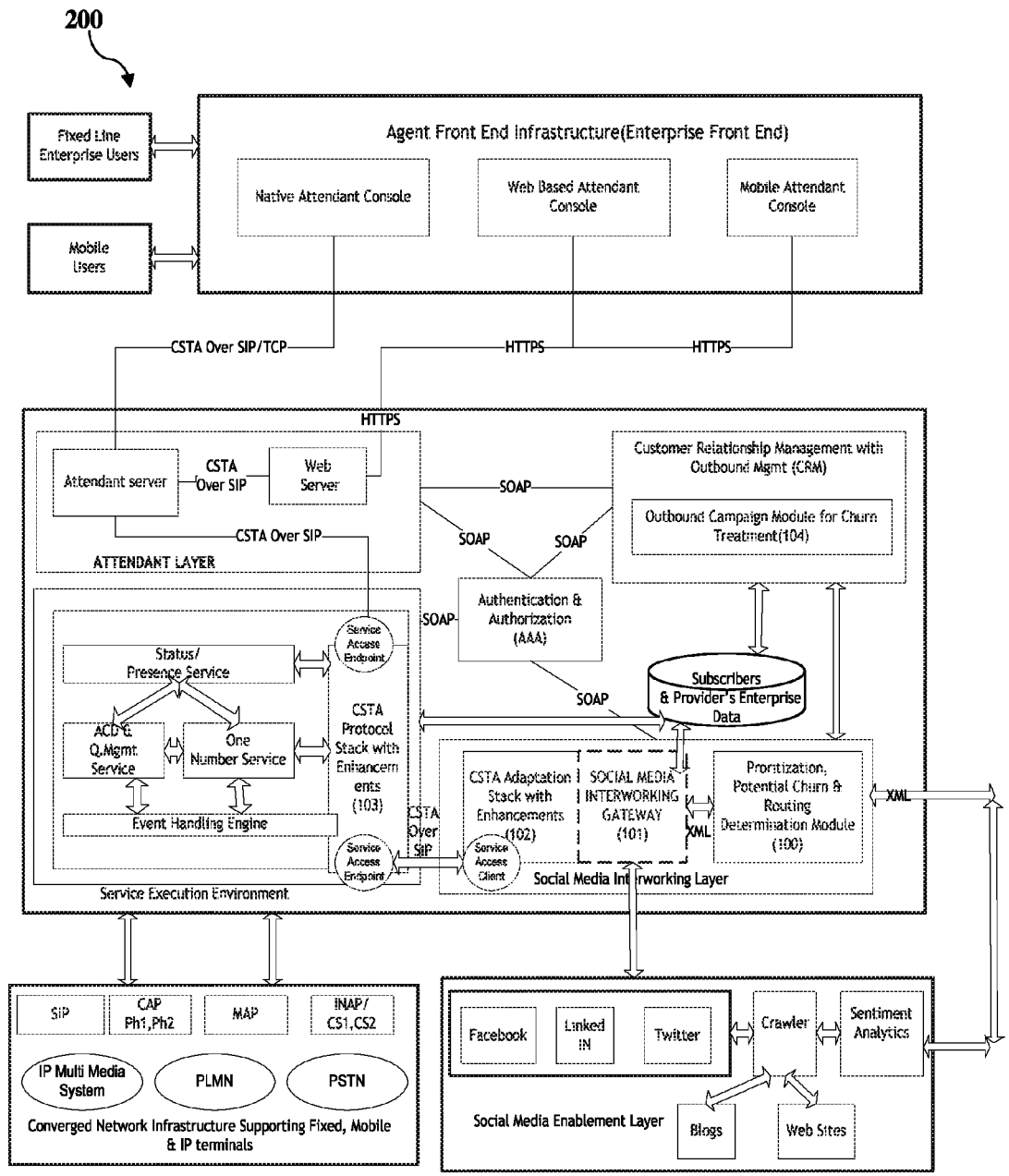
FIG. 4 illustrates a system for handling social media inputs in an existing multi-channel converged CSTA based infrastructure, in accordance an embodiment, of a Component Level Realization View depicting CSTA Enhancements.

Further to the suggested changes on prioritization and routing, one such method for implementing the social media channels in an existing CSTA based fixed mobile converged infrastructure is illustrated in FIG. 4.

Referring now to FIG. 4, there is shown an example system 200 for handling social media inputs an existing multi-channel converged CSTA based infrastructure. The figure brings out the component level realization view depicting the CSTA enhancements and the various functionalities within the system to enable implementation of the features. System 200 includes a crawling module for providing social media post as an inputs and a sentiment analytics module for performing sentiment analysis by using inputs received from the crawling module.

System 200 also includes a prioritization and churn module 100 for determining of priority and potential churn index of the posts/inputs received from the sentiment analytics module based on predetermined parameters and translating the priority and potential churn index to a predetermined combinations of severity index and anticipated churn index.

System 200 further includes a routing module (not shown) for dynamically computing predetermined parameters and routing the post received from the prioritization and churn module 100. The routing module routes the posts by leveraging "one number service" of the CSTA based infrastructure.

System 200 furthermore includes a social media interworking gateway module 101 for adapting the routed post to the CSTA specification.

Moreover, system 200 includes CSTA adaptation stack 102, to be used by the social media interworking gateway module 101 to construct the enhanced payload, and a CSTA protocol stack 103, capable of receiving service execution instructions from the CSTA adaption stack through established SIP-CSTA sessions.

System 200 further includes an outbound campaign module 104 for specifically identifying specific churn treatment based on the enhanced payload by instructing the social interworking gateway through a REST based mechanism.

Additionally, system 200 includes a graphical interface to configure to prioritization related fields, weightage and various threshold for the churn index.

Specifically, the output from the sentiment analytics module is shared to the prioritization, churn and routing determination module 100. Upon performing the required functional logic as described in FIG. 3a and FIG. 3b, the qualifiers related to prioritization, churn and routing field indicator conveying that routing is already determined is packaged as a CSTA payload and referred as "enhanced CSTA payload." It may be noted that the service/event in the CSTA Standard facilitates inclusion of implementation-specific private data. Hence, it is important to note that could the system 200 may have one implementation/embodiment which receives private data in a CSTA service or event. It is also important to note that the size of private data is not limited by the standard and is implementation specific.

An example social media interworking gateway module 101 comprises CSTA adaptation stack 102 supporting the enhanced CSTA payload. CSTA adaptation stack 102 facilitates establishment of a CSTA session with the "SAE" (Service Access Endpoint) of CSTA protocol stack 103. CSTA adaptation stack (102) facilitates establishment of CSTA with the SAE (Service Access Endpoint) and uses the SAC (Service Access client). CSTA adaptation stack 102 that uses the SAC (Service Access client) uses both the "CSTA & SIP URI" at the request URI (Uniform Resource Identifier) to initiate SIP CSTA sessions for supporting the transport of enhanced CSTA payload. The service access endpoint represents the endpoint of all SIP CSTA sessions.

It is identified by a "CSTA URI" and a SIP URI which the SAC (Service Access client) of CSTA adaptation stack 102 uses at the request URI to initiate SIP CSTA sessions to the CSTA SAE. In a typical IP multimedia system, this SIP URI represents the Public Service Identity for DNS routing.

Social interworking gateway module 101 uses CSTA adaptation stack 102 to construct the enhanced payload & sends to CSTA protocol stack 103 of the service execution environment through the established SIP-CSTA sessions. The extract below describes the aspect of the extensions from the standards documentation for ECMA 323:

```
<?xml version="1.0" encoding="UTF-8"?>
<xsd:schematargetNamespace="http://www.ecma-
international.org/standards/ecma-323/csta/ed6"
xmlns:xsd="http://www.w3.org/2001/XMLSchema"
xmlns:csta="http://www.ecma-international.org/standards/ecma-323/csta/ed6"
elementFormDefault="qualified" attributeFormDefault="unqualified">
<xsd:annotation>
<xsd:documentation>CSTA-extension-types</xsd:documentation>
</xsd:annotation>
<xsd:includeschemaLocation="security.xsd"/>
<xsd:complexType name="CSTACommonArguments">
<xsd:sequence>
<xsd:element name="security"type="csta:CSTASecurityData"minOccurs="0"/>
<xsd:element name="privateData"type="csta:CSTAPrivateData"
minOccurs="0"/>
</xsd:sequence>
</xsd:complexType>
<xsd:complexType name="CSTAPrivateData">
<xsd:choice>
<xsd:element name="string">
<xsd:simpleType>
<xsd:restriction base="xsd:hexBinary"/>
</xsd:simpleType>
</xsd:element>
<xsd:element name="private">
<xsd:annotation>
<xsd:documentation>private: actual encoding to be placed
here</xsd:documentation>
</xsd:annotation>
<xsd:complexType>
<xsd:sequence>
<xsd:any namespace="##any" maxOccurs="unbounded"/>
</xsd:sequence>
</xsd:complexType>
</xsd:element>
</xsd:choice>
</xsd:complexType>
<xsd:element name="extensions" type="csta:CSTACommonArguments"/>
</xsd:schema>
```

Further, the extract below describes aspect of the extensions as extracted from the standards documentation for ECMA 269. The support for extensions is also highlighted below:

```
CSTA-extension-types
{ iso( 1) identified-organization( 3) icd-ecma( 12)
standard( 0) csta3( 285) extension-types( 129) }
DEFINITIONS ::=
BEGIN
EXPORTS
CSTACommonArguments, CSTAPrivateData;
IMPORTS
CSTASecurityData FROM CSTA-security
{ iso( 1) identified-organization( 3) icd-ecma( 12)
standard( 0) csta3( 285) security( 128) };
CSTACommonArguments ::= [APPLICATION 30] IMPLICIT
SEQUENCE
{ security [0] IMPLICIT CSTASecurityData OPTIONAL,
privateData [1]IMPLICIT SEQUENCE OF CSTAPrivateData
OPTIONAL }
```

```
CSTAPrivateData ::=CHOICE
{string OCTET STRING,
private NULL } -- actual encoding addedhere,
-- replacing NULL with another valid ASN.1type.
END -- of CSTA-extension-types
```

The "enhanced CSTA Payload" with SIP as the chosen protocol, referred to as CSTA adaptation stack (102) in FIG. 4, is used for communicating to enhanced CSTA protocol stack (103), which maintains the SIP/CSTA sessions for the attendant/agent interaction.

The SIP packet with the enhanced CSTA Payload is addressed internally leveraging the enterprise data's already defined "One Number" so that the respective enterprises get only their related social media feedbacks. The CSTA service access point acts as the endpoint for all interactions concerning the attendant server. The attendant console acts as a CSTA client identified uniquely by the CSTA name.

Referring again to FIG. 3*a*, it may be noted that there is an outbound qualifier for social media feedbacks which have relatively a less priority. Hence, in order to have balanced blended treatment for the social media channels, the outbound module with churn treatment (104) as shown in FIG. 4 receives the notifications from the service execution environment with a view to schedule further actions including scheduling a campaign for further treatment on churn. The outbound module with churn treatment (104) of FIG. 4 identifies the specific churn treatment based on the enhanced payload by instructing the social interworking gateway through a REST based mechanism. In order to make it further clear, the following section describes the padding of the additional parameters in a logical sequence.

The social media post is analyzed as a part of the sentiment analytics and upon receipt of the social media feedback with the additional qualifiers such as prioritization and churn index, the post is send as a "CSTA Offered event" (SIP INFO) from the social interworking gateway. Essentially, the feedback from social media channel is treated as a call. As can be interpreted from the specifications, the offered event contains two important elements which are relevant in this context: "call characteristics" and "extensions." Essentially, the priority index of high, medium and low is mapped into the existing call characteristics structure and the "priorityroutingInfo" referred in the private data 8 qualifies the inbound/outbound treatment as highlighted below.

```
<xsd:complexType name="CallCharacteristics">
<xsd:sequence>
<xsd:element name="acdCall" type="xsd:boolean" minOccurs="0"/>
<xsd:element name="lowPriorityCall"type="xsd:boolean" minOccurs="0"/>
<xsd:element name="mediumPriorityCall" type="xsd:boolean" minOccurs="0"/>
<xsd:element name="highPriorityCall"type="xsd:boolean" minOccurs="0"/>
<xsd:element name="maintainanceCall" type="xsd:boolean" minOccurs="0"/>
<xsd:element name="directAgent" type="xsd:boolean" minOccurs="0"/>
<xsd:element name="assistCall" type="xsd:boolean" minOccurs="0"/>
<xsd:element name="voiceUnitCall" type="xsd:boolean" minOccurs="0"/>
<xsd:element name="privateCall" type="xsd:boolean" minOccurs="0"/>
<xsd:element name="personalCall" type="xsd:boolean" minOccurs="0"/>
<xsd:element name="sensitiveCall" type="xsd:boolean" minOccurs="0"/>
<xsd:element name="confidentialCall" type="xsd:boolean" minOccurs="0"/>
<xsd:element name="encryptedCall" type="xsd:boolean" minOccurs="0"/>
</xsd:sequence>
</xsd:complexType>
```

The priority related qualifier as captured in call characteristics section from the standards documentation are detailed below.

The "priorityroutingInfo" referred in the private data below qualifies the Inbound/Outbound treatment:

```
<extensions>
    <privateData>
        <private>
            <PriortizationInfo>
                <sentimentAnalysis>-2</ sentimentAnalysis>
                <influencerIndex>+16</influencerIndex>
    <categorization>ipBroadband<categorization>
                <alexaRank>+8</ alexaRank>
                <googleRank>+16</ googleRank>
    <likes>+36</ likes >
    <shares>+56</ shares >
    <anticipatedChurnIndex>+56</ anticipatedChurnIndex>
    <priorityroutingInfo>1</ priorityroutingInfo
                </ PriortizationInfo>
        </private>
        </privateData>
    </extensions>
```

The other parameters that are expected to be padded as a part of the message is added as "Private Data" to the extensions as indicated above. Note that the entire structure is a CSTA Payload comprising of SOAP header/body all encapsulated as a SIP INFO message with Content-Type: application/csta+xml. Note also that Social Media Interworking Gateway 101 also facilitates an additional option to choose and establish CSTA session over a TCP socket instead of a SIP-CSTA session and employ an ASN.1 encoding for more efficient transport of the Social Media Posts. Hence, the changes suggested to the payload are applicable for both the session establishment mechanisms. Although the CSTA messages are XML encoded as defined by ECMA 323 Standard, note that Social Media Interworking Gateway 101 would still have an additional option for ASN.1 encoding with a view to enhance the scaling capability, thereby improving the total number of Social Media posts handled per second.

The technical advancements of the system envisaged by the present embodiments include the realization of: (a) A CSTA based method that facilitates an efficient treatment of Social Media Channels in a typical Service Provider's Fixed Mobile Converged infrastructure OR for a CSTA supported infrastructure in an Enterprise; (b) A system that is focused on Optimized Routing in an automatic manner; (c) A system that provides a consistent way to treat the traffic across the channels including Social Media in a CSTA supported environment; (d) A system that support seamless integration with existing Multi Channel Fixed Mobile Converged Infrastructure supporting the CSTA environment; (e) A system that is focused on actively identifying potential churn and treatment in an automatic manner; and (f) A system that provides a Graphical Interface for dynamically configuring the prioritization aspects and the sliding window thereby enabling a dynamic mechanism to adapt based on traffic.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The use of the expression "at least" or "at least one" suggests the use of one or more elements or ingredients or quantities, as the use may be in the embodiment of the invention to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, although the embodiments herein have been described in terms of preferred embodiments, those skilled in the art will recognize that the embodiments herein can be practiced with modification within the spirit and scope of the embodiments as described herein.

We claim:

1. A method for handling social media inputs in an existing multi-channel converged Computer Supported Telecommunications Applications (CSTA)-based infrastructure, the method comprising:
receiving and adapting social media posts through enhanced CSTA payload to include Social Media as the social media inputs;
performing a sentiment analysis by a sentiment analyzer by using the social media inputs received from the social media posts to generate sentiment analysis inputs based on textual and non-textual content including images describing facial expression and emotions;
determining a priority and potential churn index by an indexer from the sentiment analysis inputs based on predetermined parameters, wherein each predetermined parameter has predefined weightage and scale;
translating the priority and potential churn index into qualifiers using predetermined combinations of a severity index and a potential churn index;
adapting the qualifiers for the social media posts into CSTA specifications to create adapted posts; and
determining a routing of the adapted posts for further treatment using an inbound mechanism or an outbound mechanism,
wherein the routing of the adapted posts using the inbound mechanism is carried out by leveraging a "one number service" of the CSTA-based infrastructure.

2. The method of claim 1, wherein the social media posts are received through crawlers.

3. The method of claim 1, wherein the qualifiers are selected from a group consisting of a high severity index and a high anticipated churn index, a high severity index and a medium anticipated churn index, a high severity index and a low anticipated churn index, and combinations thereof.

4. The method of claim 1, wherein the predetermined parameters for determining the priority and potential churn index comprise a sentiment analysis feedback, an influencer index, categorization values, a search engine rank, a number of likes for the social media posts, a number of shares for the social media posts, and combinations thereof.

5. A method for handling social media inputs in an existing multi-channel converged Computer Supported Telecommunications Applications (CSTA)-based infrastructure, comprising:
routing a social media post from the social media posts to an agent from a plurality of agents, wherein routing of the social media post to the agent comprises
calculating a waiting time for the social media post, wherein a maximum threshold waiting time for the social media post of a particular category is predefined;
finding an available agent if the waiting time for the social media post is less than the maximum threshold waiting time;
sending the posts to any one of a longest waiting agent and a longest engaged agent upon the social media post being qualified as "a high severity index and a high anticipated churn index";
validating and routing a reply to the social media post; and
constructing an enhanced CSTA payload comprising of a prioritization, a potential churn Index, outbound campaign identifier, and the social media posts on an established SIP-CSTA session or TCP-based CSTA session with an option to choose ASN.1 encoding instead of XML encoding.

6. A system for handling social media inputs in an existing multi-channel converged CSTA-based infrastructure, the system comprising:
a crawler to obtain social media posts as social media inputs;
a sentiment analyzer using the social media inputs capable to generate sentiment analysis inputs based on textual and non-textual content including images describing facial expression and emotions;
an indexer to determine a priority and potential churn index from the sentiment analysis inputs based on predetermined parameters and to translate the priority and potential churn index into qualifiers using predetermined combinations of a severity index and an anticipated churn index;
an adapter capable to adapt the qualifiers for the social media posts into CSTA specifications to create adapted posts;
a router capable to dynamically route the adapted posts, wherein the router routes the adapted posts by leveraging "one number service" of the CSTA-based infrastructure resulting in routed posts;
a social media interworking gateway to adapt the routed posts to the CSTA specification;
a CSTA adaptation stack used by the social media interworking gateway to construct an enhanced payload;
a CSTA protocol stack capable to receive service execution instructions from the CSTA adaptation stack through established SIP-CSTA sessions or TCP-based CSTA sessions with an option to choose ASN.1 encoding instead of XML encoding;
an outbound campaign identifier to identify specific churn treatment based on the enhanced payload by instructing the social media interworking gateway through a REST based mechanism; and
a graphical interface to configure prioritization related fields, weightage, and various thresholds for the churn index.

7. The system of claim 6, wherein the qualifiers are selected from a group consisting of a high severity index and a high anticipated churn index, a high severity index and a medium anticipated churn index, severity index and a low anticipated churn index, and combinations thereof.

8. The system of claim 6, wherein the predetermined parameters for determining the priority and potential churn index is selected from a group consisting of sentiment analysis feedback, an influencer index, categorization values, a search engine rank, a number of likes for post, a number of shares for the social media posts, and combinations thereof.

* * * * *